(12) United States Patent
Moore

(10) Patent No.: US 10,732,021 B2
(45) Date of Patent: Aug. 4, 2020

(54) METHOD AND APPARATUS FOR CALIBRATING REMAINING DOSES IN A REFILLABLE DISPENSER

(71) Applicant: GOJO Industries, Inc., Akron, OH (US)

(72) Inventor: Mark W. Moore, Aurora, OH (US)

(73) Assignee: GOJO Industries, Inc., Akron, OH (US)

( * ) Notice: Subject to any disclaimer, the term of this patent is extended or adjusted under 35 U.S.C. 154(b) by 37 days.

(21) Appl. No.: 15/595,255

(22) Filed: May 15, 2017

(65) Prior Publication Data

US 2017/0336244 A1    Nov. 23, 2017

Related U.S. Application Data

(60) Provisional application No. 62/337,462, filed on May 17, 2016.

(51) Int. Cl.
*G01G 13/24* (2006.01)
*G01F 25/00* (2006.01)
(Continued)

(52) U.S. Cl.
CPC ......... *G01G 13/248* (2013.01); *A47K 5/1217* (2013.01); *B65D 83/0005* (2013.01); *G01F 13/008* (2013.01); *G01F 25/0061* (2013.01); *G01F 25/0092* (2013.01); *A47K 5/10* (2013.01); *A47K 10/36* (2013.01); *A47K 10/42* (2013.01);
(Continued)

(58) Field of Classification Search
CPC ..... G01G 13/248; G01F 11/00; G01F 13/008; G01F 15/02; G01F 25/0061; G01F 25/0092; A47K 5/1217; A47K 5/10; A47K 5/36; A47K 5/42; A47K 2010/3226;
(Continued)

(56) References Cited

U.S. PATENT DOCUMENTS 4,331,262 A * 5/1982 Snyder ................ B65B 7/2807
                                                    141/196
4,467,657 A * 8/1984 Olsson .................... G01F 13/00
                                                    377/21
(Continued)

FOREIGN PATENT DOCUMENTS

WO    2006065515 A2    6/2006

*Primary Examiner* — Paul R Durand
*Assistant Examiner* — Andrew P Bainbridge
(74) *Attorney, Agent, or Firm* — Calfee, Halter & Griswold LLP

(57) ABSTRACT

An exemplary dispenser includes a housing and a refill unit. The refill unit being removable and replaceable. The dispenser also includes a processor, memory, a dose count stored in memory that is indicative of the number of doses in a full refill unit, a level sensor for detecting a predetermined level the refill unit and a dispense count indicative of the number doses of product dispensed from the refill unit. In addition, the dispenser includes memory and has logic stored in the memory for recalibrating the number of doses remaining in the refill unit as a function of the dose count, the number of doses of product dispensed and the predetermined level of product. The number of doses of product remaining in the refill unit may be displayed on the dispenser, on a remote station, or on both the dispenser and a remote station.

22 Claims, 6 Drawing Sheets

(51) Int. Cl.
  *B65D 83/00*     (2006.01)
  *B67D 3/00*      (2006.01)
  *G01F 13/00*     (2006.01)
  *A47K 5/12*      (2006.01)
  *A47K 5/10*      (2006.01)
  *A47K 10/42*     (2006.01)
  *A47K 10/36*     (2006.01)
  *G01F 11/00*     (2006.01)
  *A47K 10/32*     (2006.01)

(52) U.S. Cl.
  CPC .............. *A47K 2010/3226* (2013.01); *A47K 2010/3266* (2013.01); *B65D 83/00* (2013.01); *B65D 2583/005* (2013.01); *B67D 3/0077* (2013.01); *G01F 11/00* (2013.01)

(58) Field of Classification Search
  CPC ........ A47K 2010/3266; B65D 83/0005; B65D 83/00; B65D 2583/005; B67D 3/0077
  USPC ....... 700/244; 222/23, 30, 36–38, 63, 383.1, 222/190, 325–327, 360
  See application file for complete search history.

(56) References Cited

U.S. PATENT DOCUMENTS

| | | | | |
|---|---|---|---|---|
| 4,715,786 A * | 12/1987 | Wolff | ................... | G05D 7/0676 417/22 |
| 4,964,533 A * | 10/1990 | Allington | ................... | F04B 7/06 222/14 |
| 5,695,092 A * | 12/1997 | Schrandt | ............... | F04B 49/065 222/1 |
| 5,772,074 A * | 6/1998 | Dial | .................... | B05B 11/3057 222/1 |
| 5,816,448 A * | 10/1998 | Kobold | ................ | B67D 1/1211 222/36 |
| 6,267,297 B1 * | 7/2001 | Contadini | ................. | A61L 9/12 222/646 |
| 6,412,328 B1 * | 7/2002 | Cavallaro | ............. | G01B 11/08 73/1.74 |
| 6,467,651 B1 * | 10/2002 | Muderlak | ............ | A47K 5/1217 222/333 |
| 6,707,873 B2 * | 3/2004 | Thompson | ........... | A47K 5/1208 377/13 |
| 6,929,150 B2 * | 8/2005 | Muderlak | ............ | A47K 5/1217 222/1 |
| 6,955,072 B2 * | 10/2005 | Zarkar | ................ | G01F 25/0038 702/100 |
| 8,091,738 B2 | 1/2012 | Ciavarella | | |
| 8,485,395 B2 | 7/2013 | Ciavarella | | |
| 8,960,498 B2 | 2/2015 | Wegelin | | |
| 8,991,649 B2 * | 3/2015 | Wegelin | ................ | A47K 5/1217 222/1 |
| 9,172,266 B2 | 10/2015 | Curtis | | |
| 9,555,429 B2 * | 1/2017 | Wegelin | ................. | B05B 11/30 |
| 9,913,562 B2 * | 3/2018 | Wegelin | ................. | A47K 5/1217 |
| 10,130,221 B2 * | 11/2018 | Borke | ................... | G05B 15/02 |
| 2005/0139617 A1 * | 6/2005 | Lewis | .................. | A47K 5/1204 222/333 |
| 2006/0243740 A1 * | 11/2006 | Reynolds | ............ | A47K 5/1208 222/52 |
| 2007/0236346 A1 * | 10/2007 | Helal | .................. | H04L 12/2803 340/539.22 |
| 2008/0185395 A1 * | 8/2008 | Sahud | ................... | A47K 5/1217 222/36 |
| 2009/0204256 A1 * | 8/2009 | Wegelin | ................ | B05B 11/30 700/244 |
| 2010/0044407 A1 | 2/2010 | Yardley | | |
| 2013/0175291 A1 | 7/2013 | Wegelin | | |
| 2015/0053720 A1 | 2/2015 | Wolf | | |
| 2015/0223646 A1 * | 8/2015 | Wegelin | ............... | A47K 5/1211 222/1 |
| 2017/0336244 A1 * | 11/2017 | Moore | ................ | G01F 25/0061 |
| 2018/0368626 A1 * | 12/2018 | Williams, Jr. | ......... | A47K 10/24 |

\* cited by examiner

METHOD AND APPARATUS FOR CALIBRATING REMAINING DOSES IN A REFILLABLE DISPENSER

RELATED APPLICATIONS

This application claims priority to and the benefits of U.S. Provisional Patent Application No. 62/337,462 titled METHOD AND APPARATUS FOR CALIBRATING REMAINING DOSES IN A REFILLABLE DISPENSER filed on May 17, 2016, which is incorporated herein by reference in its entirety.

TECHNICAL FIELD

The present invention relates generally to refillable dispensers and in particular to a methods and apparatuses determining the remaining amount/doses of product is left in the dispenser.

BACKGROUND OF INVENTION

FIG. 1 is an exemplary prior art refillable manual dispenser, generally indicated by the numeral 10. Dispenser 10 includes a housing 12 which is wall mounted. Located within the housing 12 is a refill unit (not shown) that may be filled with soap. The housing 12 is hinged to a mounting base 14 and has an open position to permit inserting and removing refill units (not shown) the dispenser and a closed and/or locked position for operation.

The housing 12 is also provided with a bar/actuator 16 wherein a user pushes or pulls the bar in order to discharge a predetermined quantity of fluid from the nozzle. A push-type dispenser is illustrated, however, hands-free dispenser are also generally known.

The housing 12 includes a window 17 which allows a person to view the fluid level of the replaceable container. In such a system, the refill unit is replaced when a custodian notices that the refill unit is empty or near empty. Some prior art dispensers have a display that displays an amount of dispenses left in the refill unit, or turns on an indication light when the level is determined to be low.

These prior art dispensers assume a set number of dispenses per refill unit and when a new refill unit is installed, the predetermined number is displayed on the display and is decremented each time a dose of product is dispensed. In some embodiments, when a predetermined number of dispenses has occurred, an indication light is energized. Thus, if the preselected number is 100, the dispenser indicates the refill unit is empty after 100 dispenses. However, the actual number of dispenses a refill holds is not typically consistent. There are internal factors that cause variance in the number of dispenses from one refill unit to another, such as, for example, priming issues with a pump, partial dose sizes, short stroking a pump, temporary clogs, partial actuations of an actuator, and the like. There may be some variances between dispensers as well and some variances due to environmental factors. In addition, the preselected number may be selected to ensure that the refill unit is not empty prior to the preselected number being reached, thereby ensuring that there is a significant volume of product left in the refill unit when the indicator indicates that it is empty. In sum, when the prior art dispensers indicate the dispenser is empty or close to empty, it may not be empty or close to empty.

SUMMARY

Exemplary embodiments of dispensers configured to provide calibrated counts/doses of product remaining in a refill unit are disclosed herein. In some exemplary embodiments, the product is a fluid. In some embodiments, the product is a sanitizer. In some embodiments, the product is a soap. In some embodiments, the product is a lotion. In some exemplary embodiments, the product is a powder. In some exemplary embodiments, the refill unit includes a container. In some exemplary embodiments, the refill unit includes a product that is in the form of a roll. In some exemplary embodiments, the refill unit contains a product is held in folded pile. In some exemplary embodiments, the product is a paper product. In some exemplary embodiments, the product is a non-woven product. In some exemplary embodiments, the product is moistened non-woven product.

An exemplary dispenser includes a housing and a refill unit. The refill unit being removable and replaceable. In some exemplary embodiments, the refill unit contains a fluid. However, the refill unit may include roll of product, a stacked product, or the like. The refill unit may contain any product, such as, for example, any of the above exemplary products or combinations thereof. The dispenser also includes a processor, memory, a dose count stored in memory that is indicative of the number of doses in a full refill unit, a sensor for detecting a level of product in the refill unit and a dispense count indicative of the number doses of product dispensed from the refill unit. In addition, the dispenser includes memory and has logic stored in the memory for recalibrating the number of doses remaining in the refill unit as a function of the dose count, the number of doses of product dispensed and the predetermined level of product. The number of doses of product remaining in the refill unit may be displayed on the dispenser, on a remote station, or on both the dispenser and a remote station.

Another exemplary dispenser includes a housing, a container for holding product located at least partially within the housing, a processor, memory, a dose count stored in memory that is indicative of the number of doses in a full container and a sensor for detecting one or more predetermined levels of product in the container and a dispense count indicative of the number of doses of product dispensed. The dispenser includes circuitry for determining the number of doses remaining in the container as a function of the dose count, the dispense count and the one or more predetermined levels of product; and a display for displaying information indicative of the number of doses left in the container.

An exemplary methodology for displaying more accurate information indicative of the number of doses of product remaining in a refill unit in a dispenser includes providing a dispenser that has a housing, an area within the housing for receiving the refill unit, a sensor for determining one or more levels of product in the refill unit, circuitry for storing a number indicative of the number of doses of fluid in the refill unit when the refill unit is full, an actuator for dispensing product, circuitry for storing a number indicative of the number of doses of product dispensed, and a display for displaying information indicative of the number of doses of product remaining in the refill unit. The methodology includes dispensing a plurality of doses of product from the dispenser, determining a level of product in the refill unit, and calculating the number of doses of product remaining in the refill unit as a function of the number indicative of the number of doses of product in the refill unit when the refill unit is full, the number of doses of product dispensed and the level of product in the refill unit.

These and other inventive features are shown and described in detail herein.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

As used herein, the term "refill unit" is a unit that may be inserted in and/or removed from a dispenser. The refill unit includes a product that is dispensed from the dispenser. In some exemplary embodiments, the product is a fluid. In some embodiments, the product is a sanitizer. In some embodiments, the product is a soap. In some embodiments, the product is a lotion. In some exemplary embodiments, the product is a powder. In some exemplary embodiments, the product is held in a container. In some exemplary embodiments, the product is held in the form of a roll. In some exemplary embodiments, the product is held in folded pile. In some exemplary embodiments, the product is a paper product. In some exemplary embodiments, the product is a non-woven product. In some exemplary embodiments, the product is moistened non-woven product.

In addition, as used herein, the term "container" is construed broadly and may be anything that contains the product to be dispensed, such as, for example, a bottle, a roll, a tub, etc.

Figure 1:
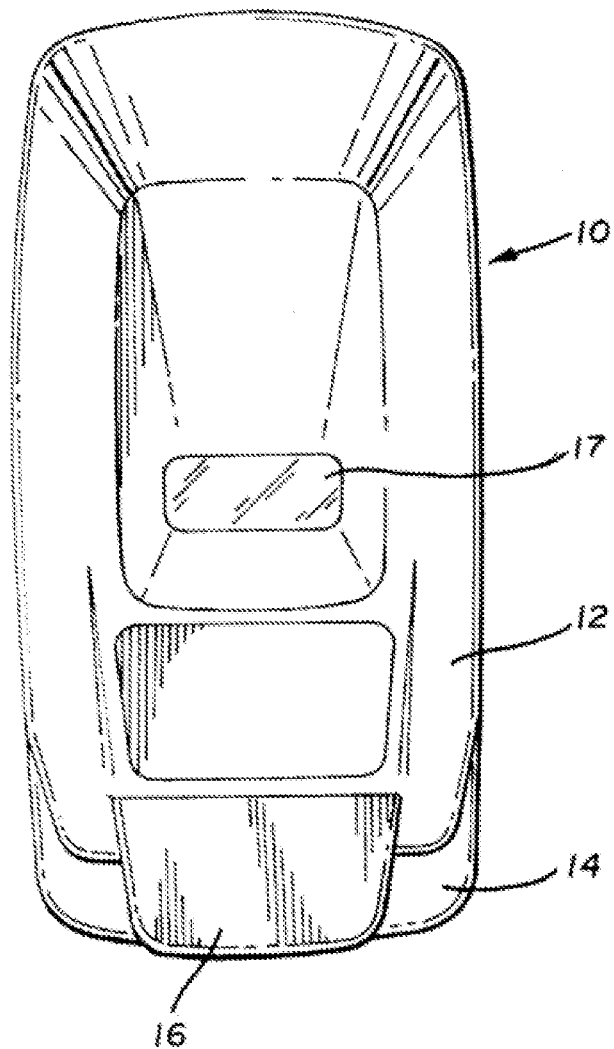
FIG. 1 is a perspective view of a prior art refillable dispenser.
Figure 2:
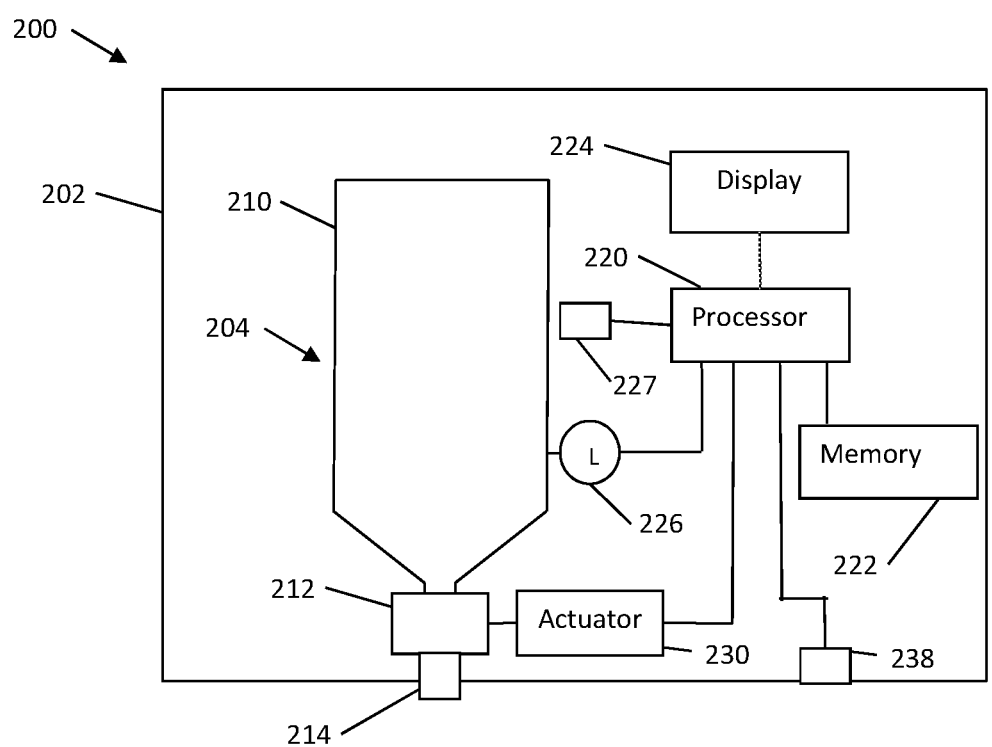
FIG. 2 is a schematic view of an exemplary embodiment of a dispenser system with a refill unit level indicator.

FIG. 2 is a schematic diagram of an exemplary embodiment of a dispenser 200. Dispenser 200 has a housing 202 and is configured to receive a refill unit 204. This exemplary refill unit 204 includes a pump 212, which may be, for example, a foam pump, a liquid pump, or the like. In addition, this exemplary refill unit 204 also includes an outlet 214. In some embodiments, a pump and outlet are not needed to dispense the product.

Dispenser 200 may be any type of dispenser. In the case of a fluid dispenser, dispenser 200 may be, for example, a touch-free dispenser or a manual dispenser. Exemplary touch-free and manual dispensers are described in, for example, U.S. Pat. No. 8,960,498 titled Touch-Free Dispenser with Single Cell Operation and Battery Banking and U.S. Pat. No. 9,172,266 titled Power Systems For Touch Free Dispensers and Refill Units Containing a Power Source, U.S. Pat. No. 8,485,395 titled Dispenser Lockout Mechanism, US Pat. App. No. 2015/0053720 titled Dispenser Having Top Loading and Unloading Refill Units, and U.S. Pat. No. 8,091,738 titled Manual Skin-Care Product Dispenser, all of which are incorporated herein by reference.

Dispenser 200 includes a processor 220 in circuit communication with a display 224, an actuator 230, memory 222, a object sensor 238, and a sensor 226. "Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Memory 222 may be any type of memory such as for example, Random Access Memory (RAM); Read Only Memory (ROM); programmable read-only memory (PROM), electrically programmable read-only memory (EPROM), electrically erasable programmable read-only memory (EEPROM), magnetic disk or tape, optically readable mediums including CD-ROM and DVD-ROM, or the like, or combinations of different types of memory. In some embodiments, the memory 222 is separate from the processor 220, and in some embodiments, the memory 222 resides on, near or within processor 220.

Processor 220 includes logic or circuitry for operating actuator 230 to dispense a dose of product and the other electronic components identified above as required. "Logic" is synonymous with "circuit" or "circuitry" and includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

Display 224 may be any type of display capable of displaying an indication of a remaining number of doses of fluid left in a refill unit. Display 224 may be, for example, a light-emitting diode display (LED); a liquid crystal display (LCD), a plasma display panel (PDP), or the like capable of displaying information to a user.

Sensor 226 may be any type of sensor that is capable of being used to determining a level or amount of a product. Sensor 226 may be an optical sensor, a proximity sensor, a weight sensor, a float, an ultrasonic sensor, a switch, a pressure gage, a level sensor, or the like. Sensor 226 may be a continuous level sensor, multiple point level sensor, or a single point level sensor. Sensor 226 is used to provide a product level/amount to processor 220.

Object sensor 238 senses that an object, such as, for example, a hand is present below the dispenser. Object sensor 238 may be, for example, an infrared emitter/sensor, a proximity sensor, a sonar emitter/sensor, an ultrasonic emitter/sensor or the like. In case of a manual dispenser, object sensor 238 may not be needed. In addition, actuator 230 may be a manual actuator and therefore would not need to be in circuit communication with processor 220.

The refillable dispenser 200 includes an actuator 230 that is in circuit communication with processor 220. In this exemplary embodiment, when a user triggers the object sensor 238, processor 220 causes actuator 230 to cycle pump 212 to dispense a dose of product. In some embodiments, the actuator 230 dispenses product without the need to use a pump. In addition, the processor 220 stores a dispense event in memory 222. In some exemplary embodiments, pump 212 may be a valve. In such case, when the valve is activated, the liquid in the container 20 would be discharged.

The sensor 226 is located within the refillable dispenser 200. In some embodiments, the sensor 226 is located on or within container 210. The sensor 226 is configured to sensor a level, volume, or amount of product. The sensor 226 is in circuit communication with processor 220. In some embodiments, the sensor is configured to determine when the product in the drops to a predetermined calibration level "PCALIBRATION", such as, for example, 20% of the full container 210. In some embodiments, the sensor 226 is a single point level sensor.

In some exemplary embodiments, processor 220 includes a predetermined number of doses that are contained in refill unit 204. This embodiment may be used when only one size refill unit is used. In some embodiments, dispenser 200 includes an input 227 for receiving a predetermined count number for the number of doses of product contained in the refill unit 204. In some embodiments, input 227 is a manual input that is set by a user.

In some embodiments, the dispenser 200 includes circuitry to read information indicative of a number of doses from the refill unit. In some embodiments, input 227 is a manual input that allows a user to select one of a number of count numbers. In some embodiments, input 227 reads information from refill unit 204 that is indicative of the number of doses. In some embodiments, input 227 comprises wireless communication circuitry for providing the number indicative of the number of doses. In some embodiments, input 227 detects one or more features of refill unit 204 and determines the number indicative of the number of doses in the refill unit. In some embodiments, input 227 is an automatic input system. In some embodiments, the information indicative of a number of doses in the refill unit are stored in a bar code that is read by input 227. In some embodiments, the information indicative of a number of doses in the refill unit are stored in an RFID tag that is read by input 227. In some embodiments, the information indicative of a number of doses in the refill unit are part of a serial number that is read by input 227.

Figure 3:
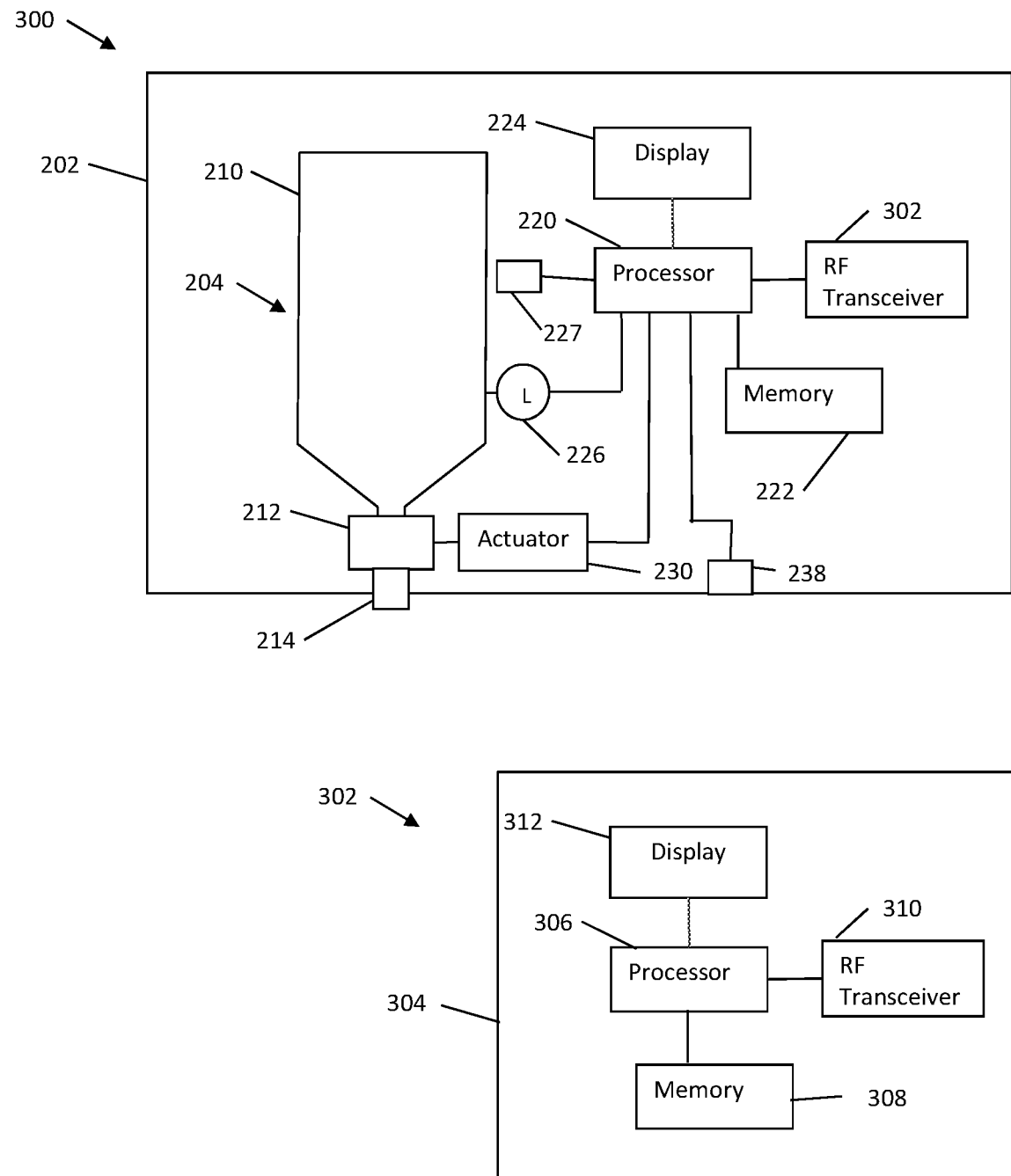
FIG. 3 is a schematic view of an exemplary embodiment of a dispenser system with a refill unit level indicator and a remote monitoring station.

FIG. 3 illustrates an exemplary embodiment of a dispenser 300 for use in an integrated system that includes a remote station 302, such as, for example, a maintenance monitoring station, a hospital compliance monitoring station or the like. Dispenser 300 is similar to dispenser 200 and like parts have like numeral identities and are not redescribed in detail herein. Dispenser 300 includes a radio frequency transceiver 302. Other wireless communication devices may be used in place of or in addition to radio frequency transceiver 302, such as, for example, an infrared emitter/receiver, Blue-Tooth, cellular, or the like. In addition, located between radio frequency transceiver 302 and remote station 302 may be one or more gateways, repeaters, one or more ANT networks, cellular transmitters/receivers, combinations thereof, and the like (not shown). Remote station 302 includes a radio frequency transceiver 310 for wirelessly communicating with dispenser 300. As described above, although a radio frequency transceiver is shown and described, any wireless communication device may be used. In addition, a hardwired communication line may be used, and therefore the radio frequency transceivers identified herein may be merely communication modules. Radio frequency transceiver 310, memory 308 and a display 312, all in circuit communication with processor 306.

Figure 4:
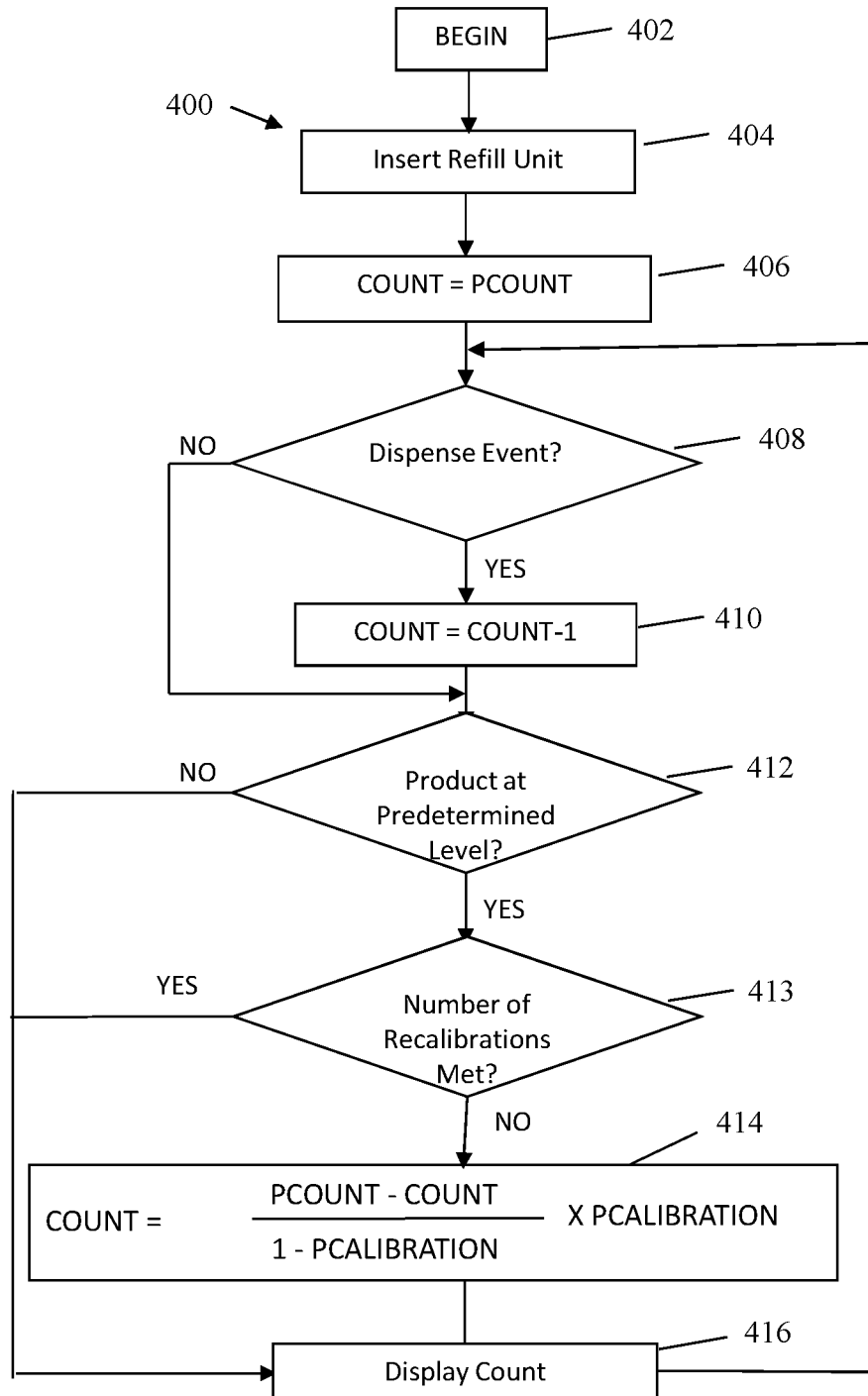
FIG. 4 is a flow chart of an exemplary methodology for displaying information indicative of the remaining volume of product left in a refill unit.

An exemplary methodology 400 for displaying a more accurate number or count of doses remaining in the refill unit is illustrated in the count calibration methodology shown and described in FIG. 4. The exemplary count calibration methodology begins at block 402. At block 404 a refill unit is installed in a dispenser. At block 406 a count number "COUNT" is automatically or manually set at a predetermined count number "PCOUNT". For example if the PCOUNT is 200, indicating there are 200 doses of product in the refill unit, COUNT is set at 200. The predetermined count number PCOUNT may vary depending on specific types of refill units. The counter COUNT is decremented each time a dose of product is dispensed, i.e. a dispense event. An exemplary way of determining a dispense event is when the actuator is activated. At block 408 a determination is made whether a dispense event has occurred. If it has occurred, the methodology decrements COUNT by 1 at block 410. If a dispense event has not occurred, or after decrementing COUNT by 1 at block 410, a determination is made as to whether the product is at a predetermined level "PCALIBRATION" at block 412. PCALIBRATION may be, for example, 20% of the product remaining. In some embodiments, multiple predetermined levels may be used. A determination is made at block 413 to determine whether the number of recalibrations have been met. If multiple predetermined levels are used, the COUNT may be recalibrated multiple times, such as, for example, when the predetermined levels are set at 50%, 30% and 20%, three recalibrations will take place, once when the fluid level reaches 50%, once when the fluid level reaches 30% and again when the product level reaches 20%. If the product is not at the predetermined level, the methodology displays the COUNT in a display. In some embodiments, the display may display a number, a letter, or combinations thereof indicative of the amount of product remaining. In some embodiments, the display displays an approximate value. In some embodiments, the display is one or more indicators, such as, for example, one or more LEDs If at block 412 a determination is made that the product was down to a predetermined level, and the number of recalibrations have not been met, COUNT is recalibrated. If the number of recalibrations have been met, COUNT is displayed at block 416. In this exemplary embodiment, COUNT is calibrated per the formula below.

$$\text{COUNT} = \frac{PCOUNT - COUNT}{1 - PCALIBRATION} \times PCALIBRATION$$

Once the COUNT is recalibrated, the recalibrated COUNT is displayed at block 416. In some embodiments, the display is on a local display. In some embodiments the display is on a remote display. In some embodiments, the display is on both a local display and a remote display. In some embodiments the display is a visual display. In some embodiments the display is indicative of a number of doses of product left in the dispenser. In some embodiments the display is on or more indicators, such as, for example, indicating lights.

As an example, if the refill unit being installed in the dispenser has a PCOUNT of 200, COUNT is set at 200 at block 406. As the dispenser is used, COUNT is decremented by 1 at block 410 for each activation of the actuator. When the product hits the predetermined level, set at, for example, 20% of the contents of the refill unit, COUNT is recalibrated at block 414. If at that time COUNT is a number, such as, for example, 30 (200-170 dispenses) the count is recalibrated from 30 (200-170), which is how many doses would be expected to be left to 42 dispenses left ((200-170)/(1-0.2))*0.2=42.5), which is a more accurate number of doses are left left. If in this example, COUNT was at 50 (200-150 dispenses) when the predetermined level was reached (20%), COUNT would be recalibrated to show 37 doses left. In the first example, the refill unit was being depleted at a slower rate than expected, while in the second example, the refill unit was being depleted at a faster rate than expected.

In some embodiments herein, a single product level is used to recalibrate COUNT, in some embodiments two or more product levels are used to recalibrate COUNT.

Figure 5:
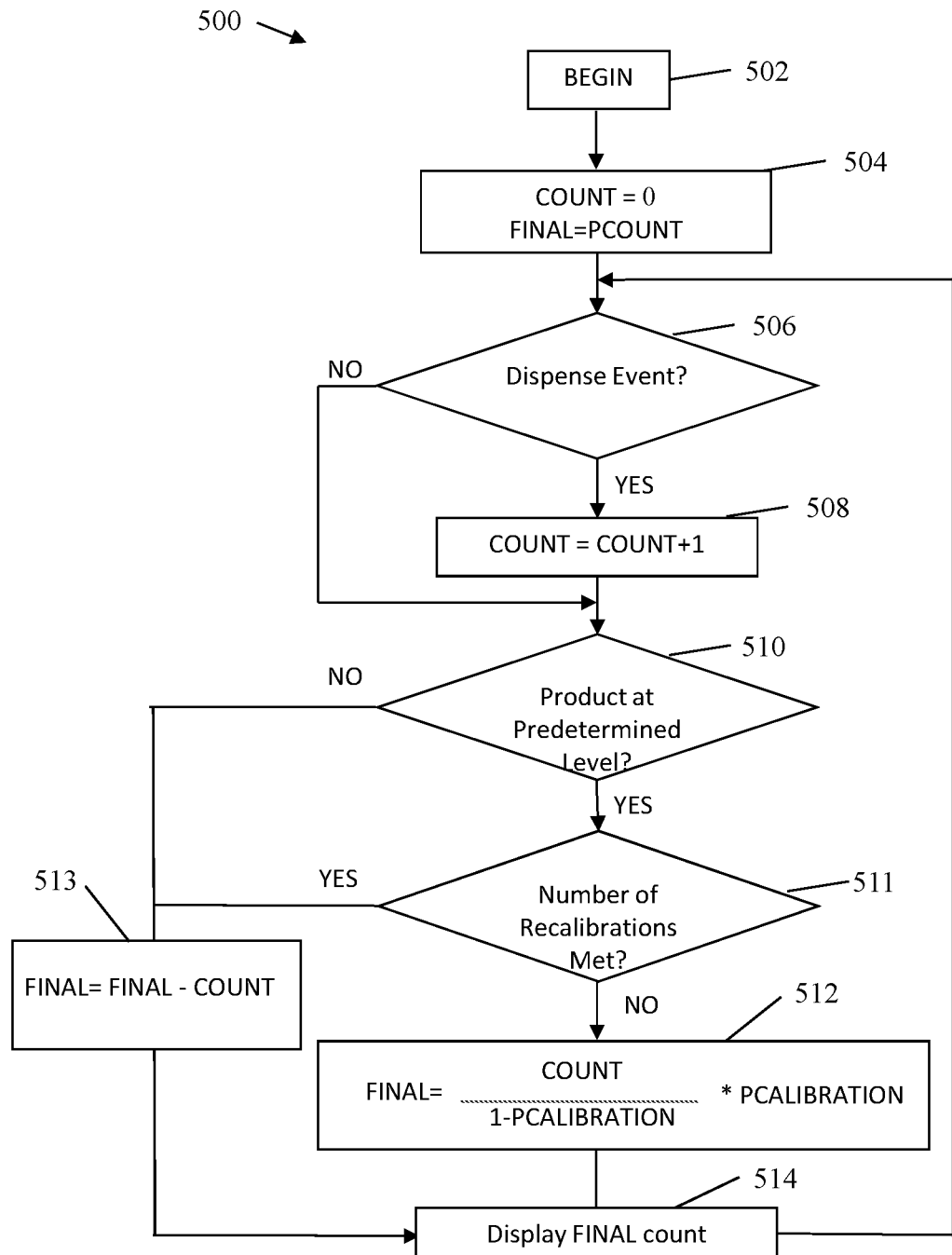
FIG. 5 is a flow chart of another exemplary methodology for displaying information indicative of the remaining volume of product left in a refill unit.

Another exemplary methodology 500 for displaying a more accurate number or count of doses remaining in the container 210 is illustrated in the count calibration methodology shown and described in FIG. 5. The exemplary methodology 500 begins at block 502 and at block 504, a new refill unit is installed and the doses dispensed number "COUNT" is set at 0 and a final count number "FINAL" is set at a predetermined count number "PCOUNT". The predetermined count number PCOUNT may vary depending on, for example the types of containers 210, the types of pumps 212, the specific type of dispensers, and the like. At block 506 a determination is made as to whether the dispenser dispensed a dose of product. If it did, the counter COUNT is incremented by 1 at block 508. The methodology determines whether the product level is at a predetermined level "PCALIBRATION", such as, for example 20% at block 510. In some embodiments, multiple predetermined levels may be used. A determination is made at block 511 to determine whether the number of recalibrations have been met. If multiple predetermined levels are used, the FINAL may be recalibrated multiple times, such as, for example, when the predetermined levels are set at 50%, 30% and 20%, three recalibrations will take place, once when the product level reaches 50%, once when the product level reaches 30% and again when the product level reaches 20%. If the product has reached the predetermined level, and the number of recalibrations has not been met, FINAL count is recalibrated at block 512 according to a formula, such as for example, $$FINAL = \frac{COUNT}{1 - PCALIBRATION} * PCALIBRATION$$

and the FINAL number of doses left is displayed at block 514. If the number of recalibrations are met, or the fluid is not at the predetermined level, FINAL is calculated at block 513 by the formula FINAL=FINAL-COUNT and the FINAL count of doses left is displayed at block 514.

In some embodiments, the display is on a local display. In some embodiments the display is on a remote display. In some embodiments, the display is on both a local display and a remote display. In some embodiments the display is a visual display. In some embodiments the display is indicative of a number of doses of fluid left in the dispenser. In some embodiments the display is on or more indicators, such as, for example, indicating lights.

As an example, if a refill unit is installed at block 502 and the PCOUNT is 200, FINAL is set at 200 at block 504. As the actuator is activated, COUNT is incremented at block 508. If the actuator was activated 150 times, and the predetermined level, was, for example, 30%, and was reached at block 510, FINAL is recalibrated at block 512. In this example, FINAL is determined to be 64 doses left, which is displayed at block 514. In another example, if COUNT was 170 when the predetermined level, such as for example, 30% was reached, FINAL is recalibrated at block 514 to be 72. In yet another example, if COUNT reached 170 and the predetermined level was 20% of the volume of the container, the recalibrated FINAL would be 42 doses left.

Figure 6:
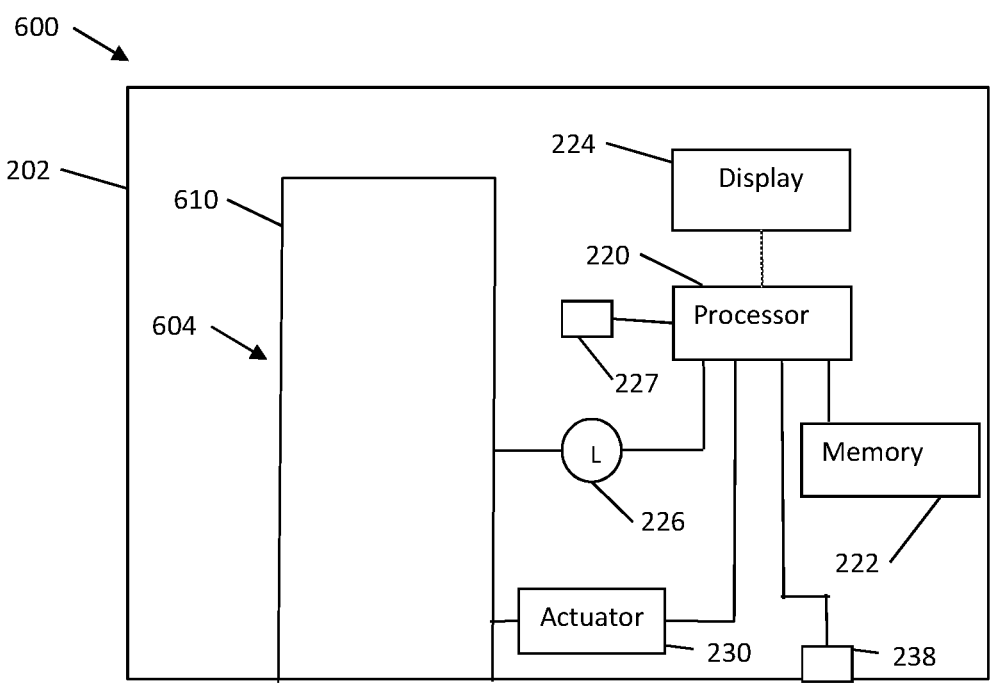
FIG. 6 is a schematic view of another exemplary embodiment of a dispenser system with a level indicator.

FIG. 6 illustrates another exemplary embodiment of a dispenser 600. Dispenser 600 is similar to dispenser 200 and like parts have like numeral identities and are not redescribed in detail herein. Dispenser 600 includes a refill unit 604, which includes a supply of product 610. Product 610 is generically illustrated and may be any product, such as, for example, those described above. Also as described above, sensor 226 may be any type of sensor the provides an indication of an amount of product. Sensor 226 may be used to detect a level, a volume, a depth, a height, a weight, or the like.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

I claim:

1. A dispenser system comprising:
a dispenser housing;
a refill unit;
   the refill unit being removable and replaceable from the dispenser housing;
   the refill unit containing a product to be dispensed;
a processor;
memory;
a dose count stored in memory that is indicative of the number of doses remaining in the refill unit;
a product level sensor for detecting a level of product in the refill unit;
an object sensor for sensing an object;
logic for causing the processor to provide a signal to dispense a dose of product upon the object sensor sensing an object;
a dispense count indicative of the number doses of product dispensed from the refill unit;
the processor increasing the dispense count when a dose of product is dispensed;
logic causing the processor to recalibrate the dose count as a function of the previous dose count, the number of doses of product dispensed and the detected level of the product; and
a display for displaying the number of doses of product remaining in the refill unit.

2. The dispenser system of claim 1 wherein the dispense count increases for each dose of product dispensed.

3. The dispenser system of claim 1 wherein the dispense count decreases for each dose of product dispensed.

4. The dispenser system of claim 1 wherein the level is detected at a first predetermined level of product in the refill unit and a second predetermined level of product in the refill unit and the dispenser comprises logic for recalibrating the number of doses remaining in the refill unit a second time.

5. The dispenser system of claim 1 wherein the product level sensor is an optical level sensor.

6. The dispenser system of claim 1 wherein the product level sensor is part of the refill unit.

7. The dispenser system of claim 1 wherein the number of doses of product remaining in the refill unit are displayed at a remote station.

8. The dispenser system of claim 1 wherein the display for displaying number of doses of product remaining in the refill unit is on the dispenser.

9. The dispenser system of claim 1 further comprising an input for changing the dose count.

10. The dispenser system of claim 9 wherein the input is a manual input.

11. The dispenser system of claim 1 wherein the display is located on the dispenser.

12. The dispenser system of claim 1 wherein the display is located remotely the dispenser.

13. A dispenser system comprising:
a dispenser housing;
a receptacle for receiving a refill unit at least partially located within the dispenser housing;
a processor;
memory;
a dose count stored in memory that is indicative of the number of doses in the refill unit;
a level sensor for detecting one or more predetermined levels of product in the refill unit;
a dispense count indicative of the number of doses of product dispensed;
an object sensor for sensing an object;
circuitry for causing the processor to initiate the dispensing of a dose of product;
logic for causing the processor to update the dispense count;
circuitry for determining the number of doses remaining in the refill unit as a function of the dose count, the dispense count and the one or more predetermined levels of the product; and
a display for displaying information indicative of the number of doses left in the refill unit.

14. The dispenser system of claim 13 wherein the product is a fluid.

15. The dispenser system of claim 13 further comprising a second predetermined level of product in the refill unit and comprises logic for recalibrating the number of doses remaining in the refill unit a second time.

16. The dispenser system of claim 13 wherein the level sensor is an optical level sensor.

17. The dispenser system of claim 13 wherein the display for displaying number of doses of product remaining in the refill unit is on the dispenser.

18. The dispenser system of claim 13 further comprising wireless communication circuitry for transmitting the number of doses of product left to a remote station.

19. A dispenser system comprising:
a dispenser housing;
a refill unit;
the refill unit being removable and replaceable;
the refill unit containing a product to be dispensed;
a processor;
memory;
a dose count stored in memory that is indicative of the number of doses remaining in the refill unit;
an object sensor for detecting an object;
logic for causing the processor to initiate the dispensing of a dose of product;
logic for updating a product dispense count;
a level sensor for detecting a level of product in the refill unit;
logic stored in memory for recalibrating the number of doses remaining in the refill unit as a function of the detected level of the product; and
logic for producing a signal indicative of the number of doses of product remaining in the refill unit.

20. The dispenser system of claim 19 wherein the signal indicative of the number of doses of product remaining in the refill unit is transmitted to a display on a remote station.

21. The dispenser system of claim 20 further comprising a display, and wherein the display is located on the dispenser.

22. The dispenser system of claim 19 wherein recalibrating the number of doses remaining in the refill unit is also a function of the number of doses dispensed from the dispenser.

* * * * *